Sept. 20, 1960        B. BARENYI        2,953,409
VEHICLE BODY CONSTRUCTION FOR MOTOR VEHICLES
Filed Jan. 9, 1957
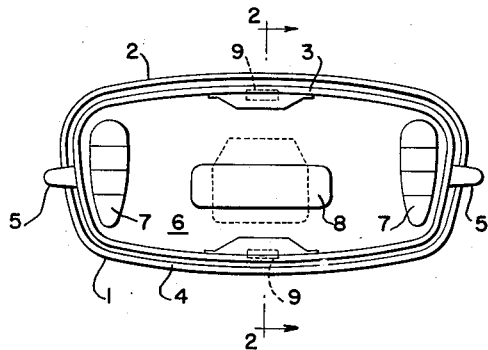
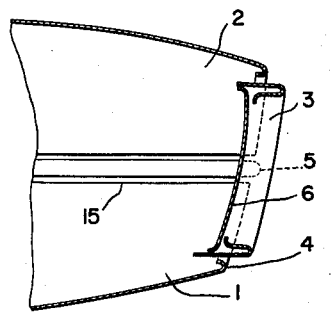
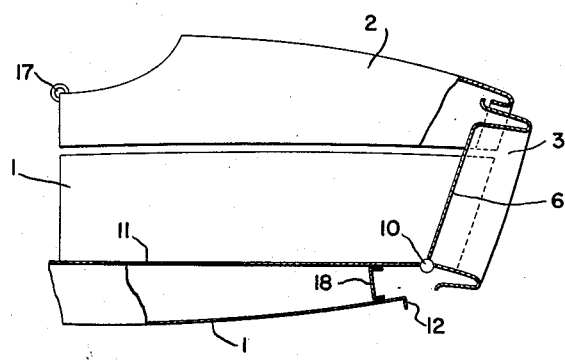
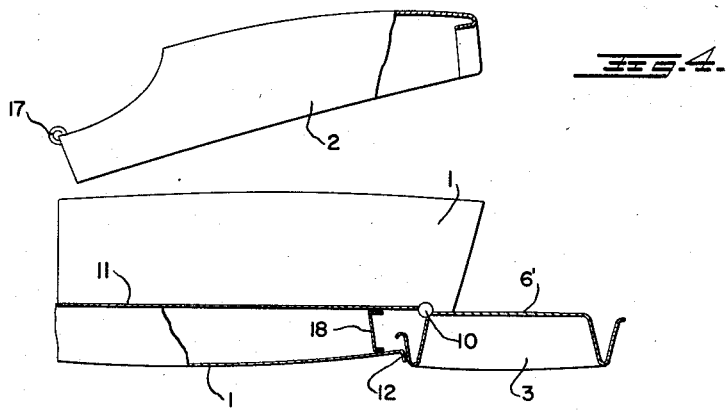
INVENTOR
BELÁ BARENYI
BY
ATTORNEYS

United States Patent Office 2,953,409
Patented Sept. 20, 1960

2,953,409

VEHICLE BODY CONSTRUCTION FOR MOTOR VEHICLES

Béla Barenyi, Stuttgart-Vaihingen, Germany, assignor to Daimler-Benz Aktiengesellschaft, Stuttgart-Unterturkheim, Germany Filed Jan. 9, 1957, Ser. No. 633,241

Claims priority, application Germany Jan. 11, 1956

9 Claims. (Cl. 296—28)

The present invention relates to the construction of motor vehicle bodies, and more particularly to the end or terminal portions of motor vehicle bodies, and consists essentially in that the sheathing or outer covering of the vehicle body end part terminates transversely to the direction of movement of the vehicle with an aperture which corresponds at least approximately to the cross section of the vehicle end portion, and in that a frame independent of the outer covering of the vehicle body is arranged in this aperture in such a manner that it projects outwardly therebeyond and presents a part for receiving collision impacts which as shown in Figures 2 and 3 constitutes the rear-most extending part of the end portion of the vehicle body.

The closure or termination of the vehicle end portions is simplified in an advantageous manner by the present invention. Moreover, the present invention may find application to the front end of the vehicle as well as particularly to the rear end of motor vehicles.

According to the present invention, the vehicle body end portion may also appropriately be formed in such a manner that the extent of the leg portions of the frame in the direction of movement of the vehicle amounts to a multiple of the extent thereof in a direction perpendicular thereto.

Possibly the frame may consist of a sheet metal strip which is bent in cross section into U- or V-shape and which is provided along the edges thereof with angularly bent flanges. The frame of the vehicle body end portion according to the present invention may appropriately be yieldably supported with respect to the sheathing or outer covering of the body so that upon the occurrence of shocks, impacts or the like the frame may yield to some extent. Possibly, the frame may also be formed yieldably or flexibly in itself, for example, it may consist of a yieldable material.

The space within the frame may be utilized in any suitable manner. Preferably a terminal wall, for example, a plate or a grate may be arranged within the frame and recessed with respect thereto, which terminal wall is formed as carrier or support member for illuminating and signalling devices arranged at the vehicle end. In connection therewith, such terminal wall together with the devices arranged thereat may be advantageously formed as a unitary, preassembled constructional group which may be secured at the frame in a readily detachable manner. Possibly, the terminal wall may also be formed unitarily with the frame, and together with the frame may consist of sheet metal or synthetic material, such as plastics or resins, etc. As shown in Figures 1, 2 and 3, the exterior body structure of the vehicle end comprises not only body walls 1 and 2 but the wall and frame structure just referred to.

A further advantageous formation of the vehicle end portion may consist in that one skirting or protective bumper is connected on each side with the frame of the vehicle body end portion which skirting or protective bumper rails separate the vehicle covering into an upper and lower part.

According to the present invention, the frame of the vehicle end portion together with the terminal wall thereof may appropriately be secured at the vehicle superstructure or vehicle body in a readily detachable manner. However, the frame together with the terminal wall thereof may also be advantageously movable with respect to the vehicle superstructure or body in that it is pivotally arranged at the vehicle superstructure; more particularly, the frame together with the terminal wall is preferably pivotal outwardly and downwardly and the rear surface of the terminal wall which is appropriately made flat may then form an essentially rectilinear extension of the floor of the vehicle end portion. In connection therewith, the lowered frame and terminal wall may be retained in the horizontal position thereof by appropriately abutting against a stop provided in the vehicle end portion. In such an embodiment, the subject matter of the present invention may advantageously serve as terminal wall of a vehicle end portion forming a luggage compartment and, lowered, may form a convenient emplacement surface for the luggage pieces which facilitates the ultimate accommodation thereof in the luggage space. A further ease in installation of the pieces into the luggage compartment may be obtained in an advantageous manner in that the vehicle end portion according to the present invention which is provided with a lowerable frame is connected with a hood-like part of the vehicle end portion which may be tilted upwardly.

Accordingly, it is an object of the present invention to provide a construction for the end portion of motor vehicles which is particularly advantageous and simple in structure as well as in installation.

Another object of the present invention relates to the construction of the end portion of the vehicle body which may be separately sub-assembled and manufactured and which is readily detachable so as to facilitate exchange in case of damage due to collision.

Another object of the present invention resides in the yieldable connection between the independent frame of the end portion and the usual sheathing or outer covering of the body walls.

A still further object of the present invention is to provide such a construction of the vehicle end portion of a motor vehicle as will facilitate construction by enabling the subassembly of the end portion frame and terminal wall together with the lighting and signalling devices which are usually arranged thereat.

A still further object of the present invention is the provision in motor vehicles of an end wall construction provided with a frame separate from the vehicle outer covering which is so arranged as to be pivotal downwardly, thereby providing an esssentially straight extension of the luggage compartment floor so as to facilitate the handling of the luggage pieces.

These and other objects, features and advantages of the present invention will become more obvious from the following description when taken in connection with the accompanying drawing which shows, for purposes of illustration only, two embodiments in accordance with the present invention, and wherein:

Figure 1 is an end view of a vehicle body construction of the rear end of a motor vehicle in accordance with the present invention.

Figure 2 is a longitudinal cross-sectional view taken along line 2—2 of Figure 1.

Figure 3 is a longitudinal cross-sectional view through another embodiment of a motor vehicle end wall construction in accordance with the present invention similar to Figure 2; and Figure 4 is a view similar to Figure 3 in which the end wall is opened and the hood is tilted upwardly.

The present invention consists essentially in that the end portion of the vehicle body, instead of being provided with the usual integrally-formed curved walls, has an aperture which extends transversely over the entire or approximately the entire cross section of the vehicle. A separate frame which may be U- or V-shaped in cross section and which may be suitably connected or formed integral with the terminal wall extending transversely of the vehicle is suitably secured, preferably yieldably to the vehicle outer covering walls of the body. The various lighting and signaling implements usually found at such terminal walls are suitably subassembled together with the frame and terminal wall.

Referring now to the drawing, wherein like reference numerals are used throughout the various views to designate corresponding parts, and more particularly to Figures 1 and 2 thereof, the outer covering of the body, for example, of a pontoon-shaped rear portion of a motor vehicle consists of a lower body part 1 and a hood-like upper part 2, which are normally separated from one another by a gap 15. The hood-like upper part 2 may be arranged to be pivotal upwardly by being connected in any suitable manner, not illustrated in Figures 1 and 2. The upper and lower vehicle body covering parts 2 and 1 enclose at their rear end an aperture the edge of which extends in an approximately vertical, possibly also slightly curved or plane surface and is only slightly smaller than the center cross section of the vehicle end portion. A frame 3 is suitably disposed in this aperture; the shape of the frame 3 is conformed to the shape of the aperture of the vehicle end portion in such a manner that only a narrow gap 4 remains between the frame 3 and the vehicle end parts 1 and 2. The frame 3 is secured at the vehicle frame or vehicle superstructure in any suitable manner so that it projects slightly outwardly with respect to the vehicle body coverings 1 and 2 and is adapted to absorb any possible shocks or impacts. For that purpose, the frame 3 may be appropriately supported at the vehicle frame or superstructure in a yielding or flexible manner.

In the embodiments illustrated in Figure 3 the frame 3 consists of a sheet metal strip which is bent essentially V-shaped in cross section. However, the frame 3 may also be formed of any other suitable material, for example, synthetic material such as plastics, and may be of any appropriate cross section which is suitable for the intended purpose. The frame 3 is preferably so dimensioned that the extent thereof in the direction of movement of the vehicle, i.e., in the longitudinal direction, amounts to a multiple of the extent thereof in a direction perpendicular thereto, i.e., in the transverse direction. Possibly, the frame 3 may also be yieldable in itself, and may consist of a yieldable material such as, for example, rubber or a rubber-like synthetic material. One skirting or bumper 5 each follows or is connected with the side leg portions of the frame 3, whereby the skirtings 5 are disposed in a gap 15 provided between the upper part 2 and the lower part 1 of the vehicle end portion.

The aperture of the frame 3 is closed by a wall 6 which may be formed as a plate or also as a grate. As illustrated in Figure 2, the end wall 6 may be inserted as a separate constructional part into the inner end of the frame 3 in such a manner that it is essentially recessed with respect thereto. The frame 3 may thereby be provided along the inner end with an annularly bent flange against which the closure wall 6 abuts and to which it may be secured in any suitable manner.

However, as also clearly visible from Figures 3 and 4 the closure wall 6' may be formed integrally with the frame 3. The closure wall 6 or 6' serves advantageously as carrier or support member for the illuminating and signalling devices usually arranged at the rear of the motor vehicle, and may form therewith a preassembled constructional group. For example, along both sides of the leg portions of the frame 3 one group of devices 7 may be arranged each into which different illuminating devices such as back-up light, brake light, turn-indicator light, tail-light, etc. are combined. In the center of the terminal wall 6 or 6', a license plate 8 may be mounted which may be illuminated by illuminating devices 9 which are each arranged beneath a recess in the frame 3 above and below the license plate 8.

As shown in Figures 3 and 4, the vehicle body end portion according to the present invention provided with a frame 3 and the closure wall 6' may be arranged at the vehicle end portion in a movable manner in such a way that it is tiltable or pivotal about a pivot 10. Pivot 10 is disposed in the plane of the floor 11 of the vehicle end portion which, for example, may be formed as the luggage space. The upper part 2 of the vehicle end portion may in that case be pivoted upwardly about pivot means indicated schematically at 17 and the frame 3 together with the terminal wall 6', as clearly shown in Figure 4, may be lowered, after the upward pivoting movement of the hood-like upper part 2, into the horizontal position in which it abuts against an abutment edge 12 of the lower part 1. In that position, the back surface of the terminal wall 6' which is appropriately formed planar, forms an extension of the floor 11 of the luggage compartment and thereby appropriately serves for purposes of temporarily placing thereon the luggage. Reference numeral 18 designates a reinforcing member between the floor 11 and the lower part 1.

While I have shown and described two preferred embodiments in accordance with the present invention, it is understood that the same is not limited thereto but is susceptible of various changes and modifications within the spirit of the present invention, and I intend to cover all such changes and modifications as defined within the appended claims.

I claim:

1. A body end portion for a motor vehicle having an exterior body structure comprising outer covering body walls forming an aperture in said body end portion in a direction extending transversely to the movement of the vehicle, said aperture being of cross section nearly equal to that of said body end portion, said exterior body structure further comprising frame means disposed in said aperture and a terminal wall arranged within said frame means and recessed with respect thereto, said frame means being independent of said outer covering body walls and projecting outwardly and beyond said body walls in a position in which said frame means is exposed to collision impacts directly thereupon.

2. A body end portion for a motor vehicle according to claim 1, wherein said terminal wall is a plate.

3. A body end portion for a motor vehicle according to claim 1, wherein said terminal wall is a grate.

4. A body end portion for a motor vehicle according to claim 1, wherein said terminal wall is adapted to support thereon lighting and signalling devices, said terminal wall together with said devices forming a unitary preassembled constructional group.

5. A body end portion for a motor vehicle according to claim 1, wherein said body walls are subdivided into a lower and upper part normally separable from each other and wherein said upper part is hoodlike and tiltable upwardly.

6. A body end portion for a vehicle according to claim 1, further comprising bumper members on opposite sides of said frame means secured to said frame means, said body walls comprising adjacent upper and lower parts defining a gap therebetween, said bumper members extending from opposite sides of said frame means and being disposed in said gap.

7. A body end portion for a motor vehicle according to claim 1, wherein said frame means comprises a frame member bordering said terminal wall, said frame member comprising a sheet metal strip having connected spaced walls.

8. A body end portion according to claim 1, further comprising pivot means for pivotally securing said frame means and said terminal wall to the end of said body end portion, said frame means and said terminal wall being pivotal downwardly and said terminal wall being provided with a flat back surface forming an extension of the floor of said body end portion when pivoted downwardly.

9. A body end portion according to claim 8, further comprising abutment means on the vehicle end portion for engagement with said frame means upon downward pivotal movement of the latter.

References Cited in the file of this patent

UNITED STATES PATENTS

| | | |
|---|---|---|
| 2,014,670 | Roche | Sept. 17, 1935 |
| 2,062,327 | Morrison | Dec. 1, 1936 |
| 2,358,486 | Zeeb | Sept. 19, 1944 |
| 2,359,426 | Koenig-Fachsenfeld | Oct. 3, 1944 |
| 2,490,014 | Brand | Dec. 6, 1949 |
| 2,514,695 | Dempsey | July 11, 1950 |
| 2,788,137 | Harkness | Apr. 9, 1957 |
| 2,793,907 | Hess et al. | May 28, 1957 |
| 2,829,915 | Claveau | Apr. 8, 1958 |

FOREIGN PATENTS

| | | |
|---|---|---|
| 564,309 | France | Oct. 17, 1923 |
| 890,319 | France | Nov. 2, 1943 |
| 495,603 | Great Britain | Nov. 16, 1938 |